United States Patent
Leskiw

(10) Patent No.: US 7,508,336 B2
(45) Date of Patent: Mar. 24, 2009

(54) SINGLE SCAN TRACK INITIATION FOR RADARS HAVING ROTATING, ELECTRONICALLY SCANNED ANTENNAS

(75) Inventor: Donald M. Leskiw, Syracuse, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 312 days.

(21) Appl. No.: 11/333,622

(22) Filed: Jan. 17, 2006

(65) Prior Publication Data

US 2007/0164897 A1 Jul. 19, 2007

(51) Int. Cl.
*G01S 13/72* (2006.01)

(52) U.S. Cl. .............................. 342/95; 342/96; 342/97; 342/108

(58) Field of Classification Search ............. 342/95–97, 342/90, 75, 81, 106–115
See application file for complete search history.

(56) References Cited

U.S. PATENT DOCUMENTS

| | | | | |
|---|---|---|---|---|
| 2,810,905 A | * | 10/1957 | Barlow | 342/371 |
| 4,531,125 A | * | 7/1985 | Beyer et al. | 342/96 |
| 4,649,390 A | * | 3/1987 | Andrews et al. | 342/140 |
| 5,281,971 A | | 1/1994 | Moulton | |
| 5,841,391 A | * | 11/1998 | Lucas et al. | 342/34 |
| 6,771,205 B1 | * | 8/2004 | Barton et al. | 342/13 |
| 7,375,679 B1 | * | 5/2008 | Mookerjee et al. | 342/195 |
| 2004/0239556 A1 | | 12/2004 | Nagel | |
| 2005/0128138 A1 | * | 6/2005 | McCabe et al. | 342/195 |
| 2007/0164897 A1 | * | 7/2007 | Leskiw | 342/95 |

OTHER PUBLICATIONS

International Search Report dated Apr. 14, 2008.

* cited by examiner

*Primary Examiner*—John B Sotomayor
(74) *Attorney, Agent, or Firm*—Howard IP Law Group, PC

(57) ABSTRACT

A method and radar system for detecting a target and verifying its presence to begin tracking and to enable future detections of the same target to be correctly associated with its initial detection uses two separate detections. Each detection provides three components of position measurements (range, elevation, and azimuth). The invention also pertains to an associated method for initiating a target track utilizing a rotating radar antenna having an electronic scanning antenna comprising the steps of: acquiring data representative of one or more of range, elevation and azimuth of a target, calculating target motion, forming multiple models for each degree of freedom of target motion, composing a set of initial state vectors that includes one having predictive validity for the realization of the true measurement errors and target motion.

18 Claims, 15 Drawing Sheets

← 360 degrees → target motion

Case 1:

CP for range: $\hat{r} = (R_i + R_v)/2$

CP for azimuth: $\hat{a} = (A_i + A_v)/2$

Form of the state vector: $(r, a)$

Case 2:

CV for range: $\hat{r} = (R_i + R_v)/2$
$\hat{\dot{r}} = (R_i - R_v)/\Delta T$

CP for azimuth: $\hat{a} = (A_i + A_v)/2$

Form of the state vector: $(r, \dot{r}, a)$

Case 3:

CP for range: $\hat{r} = (R_i + R_v)/2$

CV for azimuth: $\hat{a} = (A_i + A_v)/2$
$\hat{\dot{a}} = (A_i - A_v)/\Delta T$ Form of the state vector: $(r, a, \dot{a})$ Case 4:

CV for range: $\hat{r} = (R_i + R_v)/2$
$\hat{\dot{r}} = (R_i - R_v)/\Delta T$

CV for azimuth: $\hat{a} = (A_i + A_v)/2$
$\hat{\dot{a}} = (A_i - A_v)/\Delta T$ Form of the state vector: $(r, \dot{r}, a, \dot{a})$

FIG. 9

Case 1:

CP for range: $|R_i - R_V| \le \sigma_R$

CP for azimuth: $|A_i - A_V| \le \sigma_A$

Form of the state vector: $(r, a)$

Case 2:

CV for range: $|R_i - R_V| > \sigma_R$

CP for azimuth: $|A_i - A_V| \le \sigma_A$

Form of the state vector: $(r, \dot{r}, a)$

Case 3:

CP for range: $|R_i - R_V| \le \sigma_R$

CV for azimuth: $|A_i - A_V| > \sigma_A$

Form of the state vector: $(r, a, \dot{a})$

Case 4:

CV for range: $|R_i - R_V| > \sigma_R$

CV for azimuth: $|A_i - A_V| > \sigma_A$

Form of the state vector: $(r, \dot{r}, a, \dot{a})$

FIG. 10b

SINGLE SCAN TRACK INITIATION FOR RADARS HAVING ROTATING, ELECTRONICALLY SCANNED ANTENNAS

FIELD OF THE INVENTION

This application relates generally to radar systems, and more particularly to air and missile defense radars having rotating, electronically scanned antennas.

BACKGROUND OF THE INVENTION

Radar tracking is difficult, especially for air and missile targets—not only because of measurement errors, but also because of the wide variety of motion possible (with targets including, for example, helicopters, sub- and super-sonic aircraft, artillery, cruse and ballistic missiles). Track initiation constitutes a difficult part of tracking since only a minimal set of detections exist at the beginning of a track. Conventional methods for track-initiation tend not to work for this problem, as too few detections exist in one rotation period. Furthermore, such detections span too short a time interval to provide initial-tracks with a requisite predictive validity.

In general, air and missile defense radars use two types of antenna configurations: rotating antennas that cover the full 360-degrees of azimuth, but have a narrow instantaneous field of view, typically less than a few beamwidths wide; and electronically scanned antennas that do not rotate, but remain stationary and receive a much wider instantaneous field of view, which typically can cover a ninety-degree sector. A new class of antennas for air and missile defense radar is emerging that will rotate in azimuth while electronically scanning in both elevation and azimuth. This antenna technology has become cost-effective due to advancements in electronic components and the enhanced capabilities they offer. An antenna that is both rotating and is electronically scanned can provide the benefits of both the complete 360 degrees coverage and the wider electronically scanned instantaneous (but rotating) field of view. This advanced antenna technology, however, brings new challenges to radar systems, and in particular, in determining an initial-track of a target that has sufficient predictive validity using only one scan's detections.

To appreciate the problem realized and overcome by the present invention, its context within the data processing function of a radar system should be understood. In general, the primary functions of most air and missile defense radar systems are to detect and to report the presence of new threats (i.e. targets). A secondary function is to track those targets, which directly supports the surveillance function by reducing the probability of re-reporting a given target falsely as a new target the second and subsequent time it is detected. Between these two functions (the initial detection of a new target and tracking it) sits the sub-functions of verification and track initiation.

FIG. 1a-b illustrate operation of a prior art radar antenna that only rotates. Here the radar accomplishes surveillance and tracking using a common set of detections, which detections serve both to verify the existence of new targets and to determine their initial-tracks. FIG. 1a illustrates operation of an azimuthally rotating (no azimuthal electronic scan) wherein rotation of the antenna covers an area of 360 degrees in one scan, 100, with instantaneous coverage being one beamwidth, 102. Rotation of the antenna prevents the radar from determining initial-tracks using only one scan's worth of detections—during one rotation period of the antenna the target might be detected only once and hence the detection cannot be verified.

FIG. 1b illustrates the conventional method these radars use for track initiation, the so-called "track before detect" (TBD) method. A sequence of scans 1-4 (antenna rotations) first determines which detections in a given scan are not associated with any known track. Through processing of the detected data the system constructs a set of candidate initial-tracks from those unassociated detections and determines the best initial-track from among those candidate tracks. The TBD method accordingly accomplishes the two functions of target verification and track initiation concurrently, but requires several scans to complete. A relatively larger time between scans requires more than one detection be tested for possible verification.

FIG. 2a illustrates the case of a radar antenna that is fully electronically scanned but does not rotate. This antenna can provide data on a target virtually without interruption for as long as the target is within its much wider, albeit stationary field of view. Such non-rotating, electronically scanned (e.g. in azimuth and elevation) systems have larger instantaneous coverage 102' but do not cover the full 360 degrees. As illustrated in FIG. 2b, such radar can proceed immediately from an initial unassociated detection to verification and then into track initiation. The conventional track initiation method used for a fully electronically scanned antenna that does not rotate is to immediately point a verification beam directly at an unassociated detection and attempt to re-detect the target (until a timeout) and, since the unknown target is possibly moving, place the next beam at the location of the previous detection to thereby collect a sequence of measurements on the moving target's position until an initial-track having sufficient predictive validity can be constructed. This radar accordingly accomplishes the two functions of target verification and track initiation sequentially.

As further background on the problem of track initiation, FIG. 3 provides an exemplary illustration of a radar detection in two dimensions, the XY-plane, of a target whose motion is defined by two independent and unknown functions of time $x(t)$ and $y(t)$. A radar located at the coordinate origin attempts to detect the target and to measure its position in terms of its range and azimuth, $(r, a)$, relative to the radar. These components are similar to polar coordinates and accordingly are identified as the radar coordinates of the target. Basic trigonometry provides the relationships between Cartesian and radar coordinates: $x = r \sin a$ and $y = r \cos a$. In FIG. 3 the true position of the target at the time of detection is denoted by the closed dot while the detection of the target by the radar is denoted in FIG. 3 by the symbol x. The detection provides noisy measurements of the radar coordinates, $(R, A)$, which contain errors, $(\epsilon_R, \epsilon_A)$, and so the relationships between the measured values of the radar coordinates and the unknown true ones are $R = r + \epsilon_R$ and $A = a + \epsilon_A$. In the sequel all measurements will be presented as being unbiased and identically distributed with standard deviations $\sigma_R$ and $\sigma_A$, which simplifies the notation, but the apparatuses, systems and methods presented here are valid for the general case where measurements are biased and have different variances.

Referring to FIG. 4, there is illustrated a two-dimensional confidence interval of the aforementioned noisy measurement of the target's range and azimuth. As is known by those skilled in the art, in two dimensions a confidence interval 400 is an ellipse, and in three dimensions it is an ellipsoid. A position confidence interval is where the true position of the target is found during a specified percentage of an interval of time. In FIG. 4 the true position of the target is the closed dot 410 while the measurement 420 is the "x" at the center of the ellipse.

Before determining the initial-track, given a new detection, the first problem the radar solves is that of confirming whether a detection proves to be a new target, as opposed to a detection that proves not to be a target referred to as a false alarm. Obtaining a second, independent detection close in time to the first detection is generally desired for this purpose. If the detections are sufficiently close in time, then the unknown motion of the target can be ignored for the purpose of verification. If, however, the time between the two detections is large, then the outcome may be inconclusive.

Referring to FIG. 5a there is illustrated two detections 510, 520 of the same target that are sufficiently close in time so that their position measurement confidence intervals overlap, which is then taken to imply the positive verification of the target's existence and not a false alarm. However, in FIG. 5b the two detections of the same target are not sufficiently close in time, in which case the unknown motion of the target manifests itself and defeats simplistic verification. Thus, there is ambiguity as to whether one target does indeed exist, or whether there are two (unverified) targets; or that there are two false alarms, or that one target exists and that there is a false alarm.

Computationally, simplistic target verification using two independent detections can be accomplished using a chi $\chi^2$ type test with a threshold $\gamma^2$. For example, let $(R_i, A_i)$ be the position measurement of the initial detection, $(R_v, A_v)$ be the position measurement of the verification detection, and let the variances of the respective measurement components be $(\sigma_R^2, \sigma_A^2)$. Then the outcome of the conventional chi-squared verification method that the detections serve to verify the existence of the target, can be expressed algebraically as $$\frac{(R_i - R_v)^2}{2\sigma_R^2} + \frac{(A_i - A_v)^2}{2\sigma_A^2} \leq \gamma^2. \qquad \text{Equation 1}$$

In contrast, outcome of the conventional chi-squared verification method that the detections do not serve to verify the existence of the target, is $$\frac{(R_i - R_v)^2}{2\sigma_R^2} + \frac{(A_i - A_v)^2}{2\sigma_A^2} > \gamma^2. \qquad \text{Equation 2}$$

If two independent detections are deemed to be associated, and hence they verify the existence of a new target, they also can be used to determine its initial-track. For example, for either of the two sets of detections in FIG. 5a-b, the prior art method for determining the motion of the target is to average the position measurements and also to difference them. This, in turn, leads to an estimate of the position and velocity of the target (with more than two detections a method of least-squares is used). Thus if $(R_i, A_i)$ is the position measurement of the initial detection at time $t_i$ and $(R_v, A_v)$ is the position measurement of the verification detection at time $t_v$, then the initial-track for the target's motion is $$\begin{bmatrix} \hat{r} \\ \hat{\dot{r}} \\ \hat{a} \\ \hat{\dot{a}} \end{bmatrix} = \begin{bmatrix} (R_i + R_v)/2 \\ (R_i - R_v)/\Delta T \\ (A_i + A_v)/2 \\ (A_i - A_v)/\Delta T \end{bmatrix} \text{ with } \Delta T = t_i - t_v \neq 0. \qquad \text{Equation 3}$$

In Equation 3 as well as in the sequel, an over-carrot, "^", indicates that the symbol is an estimated quantity and not a true value. Also, in Equation 3 the estimated quantities have been arranged into the form of a "state vector". This state vector is the initial-track of the target in radar coordinates. An alternative form for the state vector is to express it in Cartesian coordinates, $(\hat{x}, \hat{\dot{x}}, \hat{y}, \hat{\dot{y}})$. A state vector in radar coordinates is more statistically valid, but a state vector in Cartesian coordinates is more generally useful. The Cartesian state vector, however, is not unique. There are two paths available for determining its components from the radar measurements: either first transform the measurements from radar coordinates into Cartesian coordinates and then apply the sum and difference operations on them; or first determine the state vector in radar coordinates using Equation 3 and then transform that state vector into Cartesian (rectangular) coordinates—the prior art for these two paths to $(\hat{x}, \hat{\dot{x}}, \hat{y}, \hat{\dot{y}})$ are illustrated in FIG. 6, blocks 610, 620, 630, and 640. These two Cartesian state vectors are similar but are not equal since the transformation between radar and rectangular coordinates is non-linear.

Since the measurements have errors, the components of the state vector of an initial-track will also have errors. Specifically, in terms of the unknown true position of the target, (r, a), and the respective measurement errors of the position measurement, $(\sigma_R^2, \sigma_A^2)$, the errors of the initial-track position are $$\hat{r} - r = (\epsilon_R(t_i) + \epsilon_R(t_v))/2$$

$$\hat{a} - a = (\epsilon_A(t_i) + \epsilon_A(t_v))/2. \qquad \text{Equation 4}$$

In terms of the unknown true velocity of the target, $(\dot{r}, \dot{a})$, the errors of the initial-track position velocity of the initial-track are $$\hat{\dot{r}} - \dot{r} = (\epsilon_R(t_i) - \epsilon_R(t_v))/\Delta T$$

$$\hat{\dot{a}} - \dot{a} = (\epsilon_A(t_i) - \epsilon_A(t_v))/\Delta T$$

$$\text{with } \Delta T = t_i - t_v \neq 0. \qquad \text{Equation 5}$$

For the variances of the components of the initial track given in Equation 4 and Equation 5 are (valid at the midpoint time, $(t_i + t_v)/2$, when the respective measurement errors are unbiased and identically distributed)

$$\text{var}(\hat{r}) = \sigma_R^2/2 \text{ and } \text{var}(\hat{\dot{r}}) = 2\sigma_R^2/\Delta T^2$$

$$\text{var}(\hat{a}) = \sigma_A^2/2 \text{ and } \text{var}(\hat{\dot{a}}) = 2\sigma_A^2/\Delta T^2. \qquad \text{Equation 6}$$

Now together Equation 1 and Equation 5 illustrate the essential challenge that this invention overcomes. Two (or more) detections of a target that are closely spaced in time for the purpose of verifying the existence of a new target will usually be too closely spaced in time for determining an initial-track that has sufficient predictive validity. This deficiency is caused by having to divide the differences of the position measurements by the small time interval they span, $\Delta T$—the estimated velocity components become the difference of measurement errors divided by a small time increment. The estimated velocity (and acceleration if included) so determined has little or no predictive validity. Using a larger $\Delta T$ in Equation 3 mitigates the effects of measurement errors in the velocity (and acceleration if included) and thereby increases the predictive validity of the initial track. Accordingly, the conventional track-initiation methods seek to achieve predictive validity by waiting until $\Delta T$ is sufficiently large before determining the state vector: when using an antenna that only rotates one must wait for a detection in the next scan; when using an antenna that only stares one can keep placing verification/track-initiation beams at the previous detection until $\Delta T$ is sufficiently large.

For completeness and for subsequent reference, in contrast with Equation 1, the prior art for the verification test when the radar uses three degrees of freedom is $$\frac{(R_i - R_v)^2}{2\sigma_R^2} + \frac{(E_i - E_v)^2}{2\sigma_E^2} + \frac{(A_i - A_v)^2}{2\sigma_A^2} \leq \gamma^2 \text{ (verified).} \quad \text{Equation 7}$$

$$\frac{(R_i - R_v)^2}{2\sigma_R^2} + \frac{(E_i - E_v)^2}{2\sigma_E^2} + \frac{(A_i - A_v)^2}{2\sigma_A^2} > \gamma^2 \text{ (not verified).} \quad \text{Equation 8}$$

Furthermore, in contrast with Equation 3, the prior art operation when the radar uses a zero-order model (constant position ("CP"), assumption—the target is assumed to be stationary) with three degrees of freedom, the state vector of an initial track based on two detections, $(R_i, E_i, A_i)$ and $(R_v, E_v, A_v)$ is three-dimensional, valid at the midpoint $(t_1+t_2)/2$:

$$\begin{bmatrix} \hat{r} \\ \hat{e} \\ \hat{a} \end{bmatrix} = \begin{bmatrix} (R_i + R_v)/2 \\ (E_i + E_v)/2 \\ (A_i + A_v)/2 \end{bmatrix}. \quad \text{Equation 9}$$

When the radar uses a first order model (constant velocity ("CV"), assumption—the target is assumed to have linear motion) with three degrees of freedom, the state vector of an initial track based on two detections, $(R_i, E_i, A_i)$ and $(R_v, E_v, A_v)$ is six-dimensional, valid at the midpoint $(t_1+t_2)/2$:

$$\begin{bmatrix} \hat{r} \\ \hat{\dot{r}} \\ \hat{e} \\ \hat{\dot{e}} \\ \hat{a} \\ \hat{\dot{a}} \end{bmatrix} = \begin{bmatrix} (R_i + R_v)/2 \\ (R_i - R_v)/\Delta T \\ (E_i + E_v)/2 \\ (E_i - E_v)/\Delta T \\ (A_i + A_v)/2 \\ (A_i - A_v)/\Delta T \end{bmatrix} \text{ with } \Delta T = t_i - t_v \neq 0. \quad \text{Equation 10}$$

When the radar uses a second order model (constant acceleration ("CA"), assumption) with three degrees of freedom, the state vector of an initial track based on three detections, $(R_1, E_1, A_1)$, $(R_2, E_2, A_2)$ and $(R_3, E_3, A_3)$, is nine-dimensional, valid at the midpoint $t_2=(t_1+t_3)/2$ is:

$$\begin{bmatrix} \hat{r} \\ \hat{\dot{r}} \\ \hat{\ddot{r}} \\ \hat{e} \\ \hat{\dot{e}} \\ \hat{\ddot{e}} \\ \hat{a} \\ \hat{\dot{a}} \\ \hat{\ddot{a}} \end{bmatrix} = \begin{bmatrix} R_2 \\ (R_1 - R_3)/2\Delta T \\ (R_1 - 2R_2 + R_3)/\Delta T^2 \\ E_2 \\ (E_1 - E_3)/2\Delta T \\ (E_1 - 2E_2 + E_3)/\Delta T^2 \\ A_2 \\ (A_1 - A_3)/2\Delta T \\ (A_1 - 2A_2 + A_3)/\Delta T^2 \end{bmatrix} \text{ with} \quad \text{Equation 11}$$

$$\Delta T = t_i - t_2 = t_2 - t_3 \neq 0.$$

For the class of radars having a rotating electronically scanned antennas, the simple problem of verifying the existence of a new target is essentially the same as that faced by a conventional staring, electronically scanned radar antenna, which is to associate independent detections that are closely spaced in time. Use of the conventional algorithms requires either several scans of a rotating antenna or more staring time of a non-rotating electronically scanned antenna, neither of which are available during a single scan of this antenna, which concurrently rotates and is electronically scanned.

An alternative method and system that overcomes the above-identified problems, including for example, determining that the initial-track that has sufficient predictive validity using only the detections of a target that are obtained in one rotation of its electronically scanned antenna, is highly desired.

SUMMARY OF THE INVENTION

This invention provides a method for track initiation using only the limited set of measurements that are available from the detections of a target that occur within a single revolution of a rotating, electronically scanned radar antenna. The main outcome of this new method is an initial-track that has sufficient predictive validity so that radars of this class can report the presence of new targets as soon as they are verified and not have to wait until the next scan (rotation of the antenna).

An aspect of the present invention is a method for initiating a target track utilizing a rotating radar antenna having an electronic scanning radar antenna such as a phased array antenna to improve target verification and track initiation comprising the steps of: acquiring data representative of a measurement component in a sequence of associated detections, including, but not limited to all combinations of range, elevation and azimuth that may form all possible initial tracks for each measured degree of freedom of target motion, composing a set of initial state vectors that includes the one having sufficient predictive validity for the particular realization of the true measurement errors and target motion, and their corresponding error covariance matrices.

Another aspect of the present invention is a system for initiating a target track utilizing a rotating radar antenna having an electronic scanning radar antenna such as a phased array antenna to improve target verification and track initiation including a means for acquiring data representative of a measurement component in a sequence of associated detections, including, but not limited to range, elevation and azimuth, a means for forming a complete set of likely possible kinematics orders for each degree of freedom of measured target motion, a means for composing a set of initial state vectors that includes the one having sufficient predictive validity for the particular realization of the true measurement errors, observation geometry, and target motion, and its corresponding error covariance matrix.

Another aspect of the present invention is a method for initiating a target track utilizing a rotating radar antenna having an electronic scanning radar antenna to improve target verification and track initiation including a process for choosing an optimum state vector using a computational test; prioritizing the possible state vectors by ordering the outcomes of their respective tests and applying the tests at the component level to edit the set of measurements that support the formation of the respective component models that are used to determine the state vectors and covariance matrices of the possible initial tracks.

BRIEF DESCRIPTION OF THE DRAWINGS

This invention is best understood from the following detailed description when read in connection with the accompanying drawing. The various features of the drawing are not specified exhaustively. On the contrary, the various features may be arbitrarily expanded or reduced for clarity. Included in the drawing are the following figures and equations:

FIG. 9 illustrates models for two-degree of freedom state vectors for an initial-track based on two detections in accordance with one embodiment of the present invention.

FIG. 10b illustrates confidence interval tests to determine a model in accordance with one embodiment of the present invention.

DETAILED DESCRIPTION OF THE INVENTION

Figure 1A:
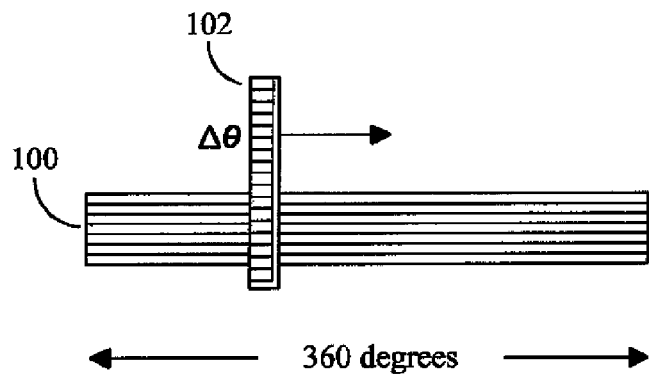
FIG. 1a-b shows the prior art for a rotating antenna for verification and track initiation.

In the figures to be discussed, the circuits and associated blocks and arrows represent functions of the process according to the present invention, which may be implemented as electrical circuits and associated wires or data busses, which transport electrical signals. Alternatively, one or more associated arrows may represent communication (e.g., data flow) between software routines, particularly when the present method or apparatus of the present invention is a digital process. The invention described herein utilizes electronic processors, such as computers having data storage means, to process the data and perform mathematical computations using algorithms for accomplishing the stated goal: determination of an initial-track having sufficient predictive validity from one scan's worth of detections.

It is understood that the subject invention may reside in the program storage medium that constrains operation of the associated processors(s), and in the method steps that are undertaken by cooperative operation of the processor(s) based upon messages within the signal and data processing network. These processes may exist in a variety of forms having elements that are more or less active or passive. For example, they exist as software program(s) comprised of program instructions in source code or object code, executable code or other formats. Any of the above may be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Exemplary computer readable signals, whether modulated using a carrier or not, are signals that a computer system hosting or running the computer program may be configured to access, including signals downloaded through the Internet or other networks. Examples of the foregoing include distribution of the program(s) on a CD ROM or via Internet download.

In the form of processes and apparatuses of the present invention implemented by digital processors, the associated programming medium and computer program code is loaded into and executed by a processor, or may be referenced by a processor that is otherwise programmed, so as to constrain operations of the processor and/or other peripheral elements that cooperate with the processor. Due to such programming, the processor or computer becomes an apparatus that practices the method of the invention as well as an embodiment thereof. When implemented on a general-purpose processor, the computer program code segments configure the processor to create specific logic circuits. Such variations in the nature of the program carrying medium, and in the different configurations by which computational and control and switching elements can be coupled operationally, are all within the scope of the present invention.

Figure 1B:
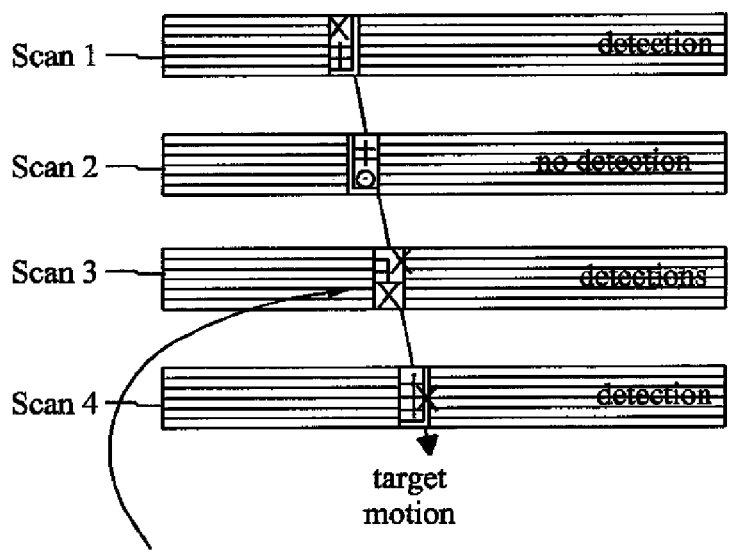
Figure 2A:
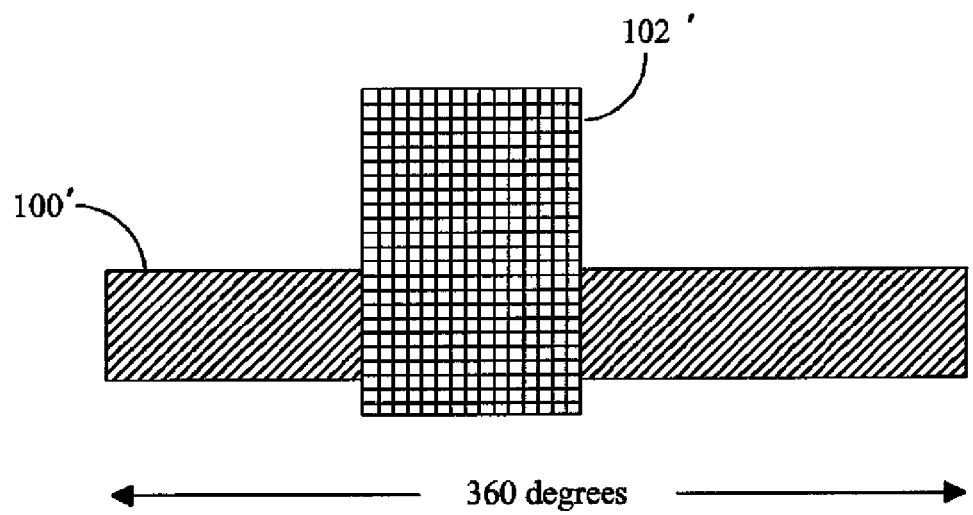
FIG. 2a-b shows the prior art for an electronically scanned non rotating antenna for verification and track initiation.
Figure 2B:
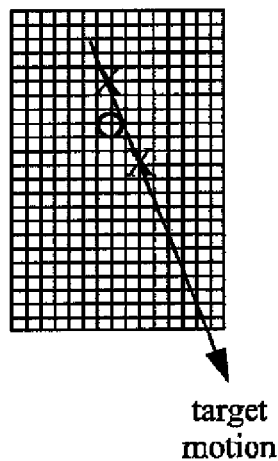
Figure 3:
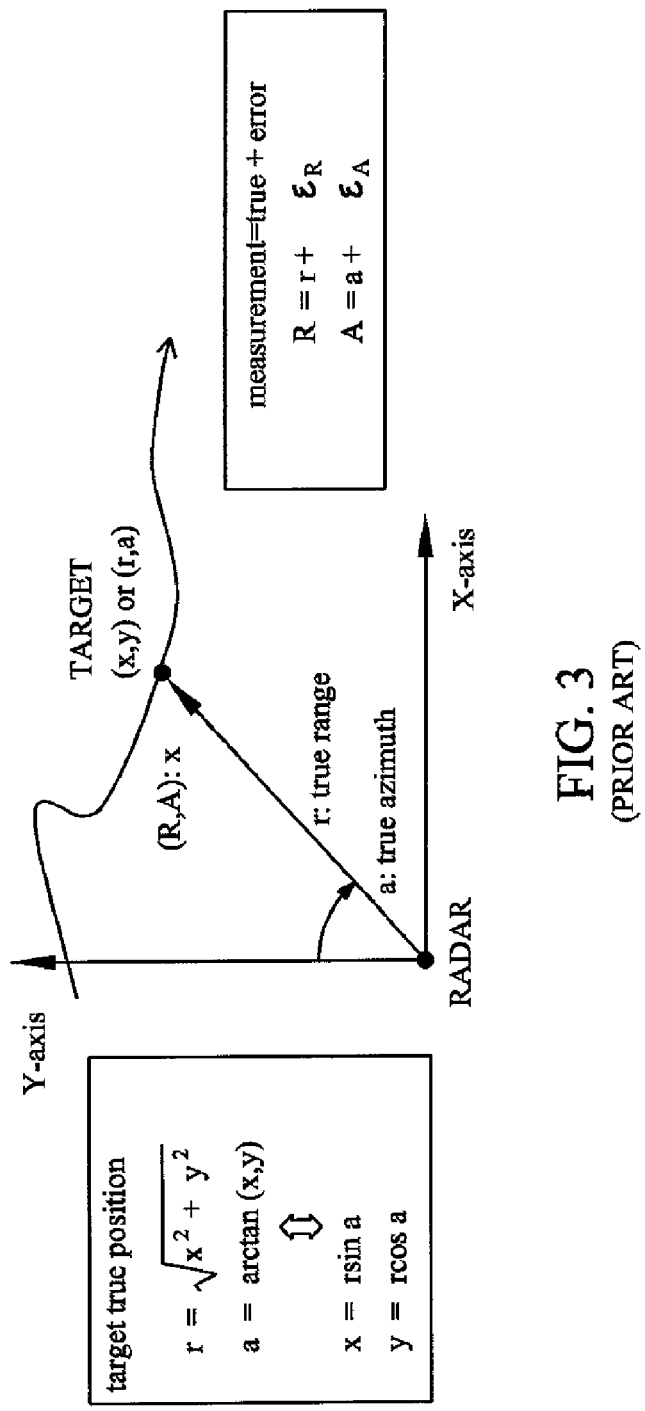
FIG. 3 shows the geometry and calculations associated with the true and measured position of a target according to a given method.
Figure 4:
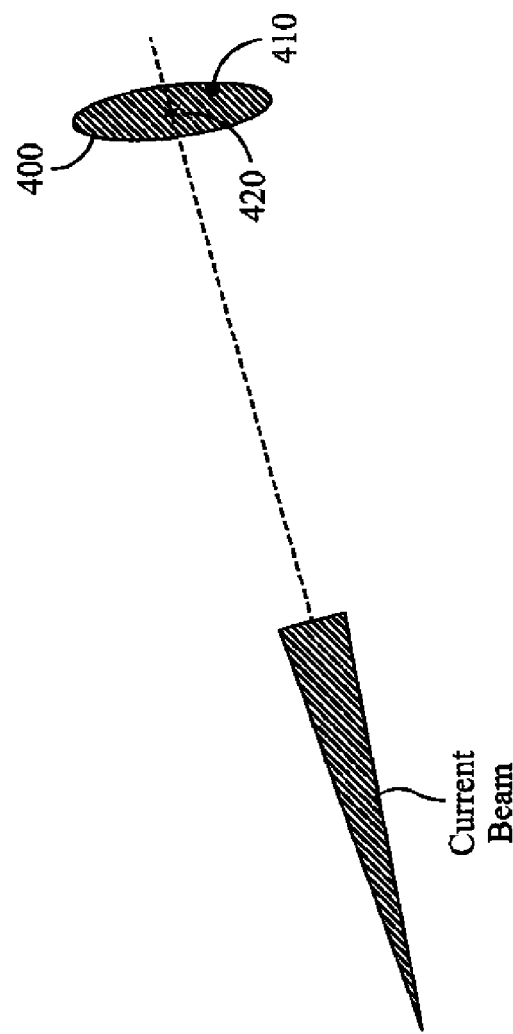
FIG. 4 shows an exemplary radar measurement uncertainty.
Figure 5:
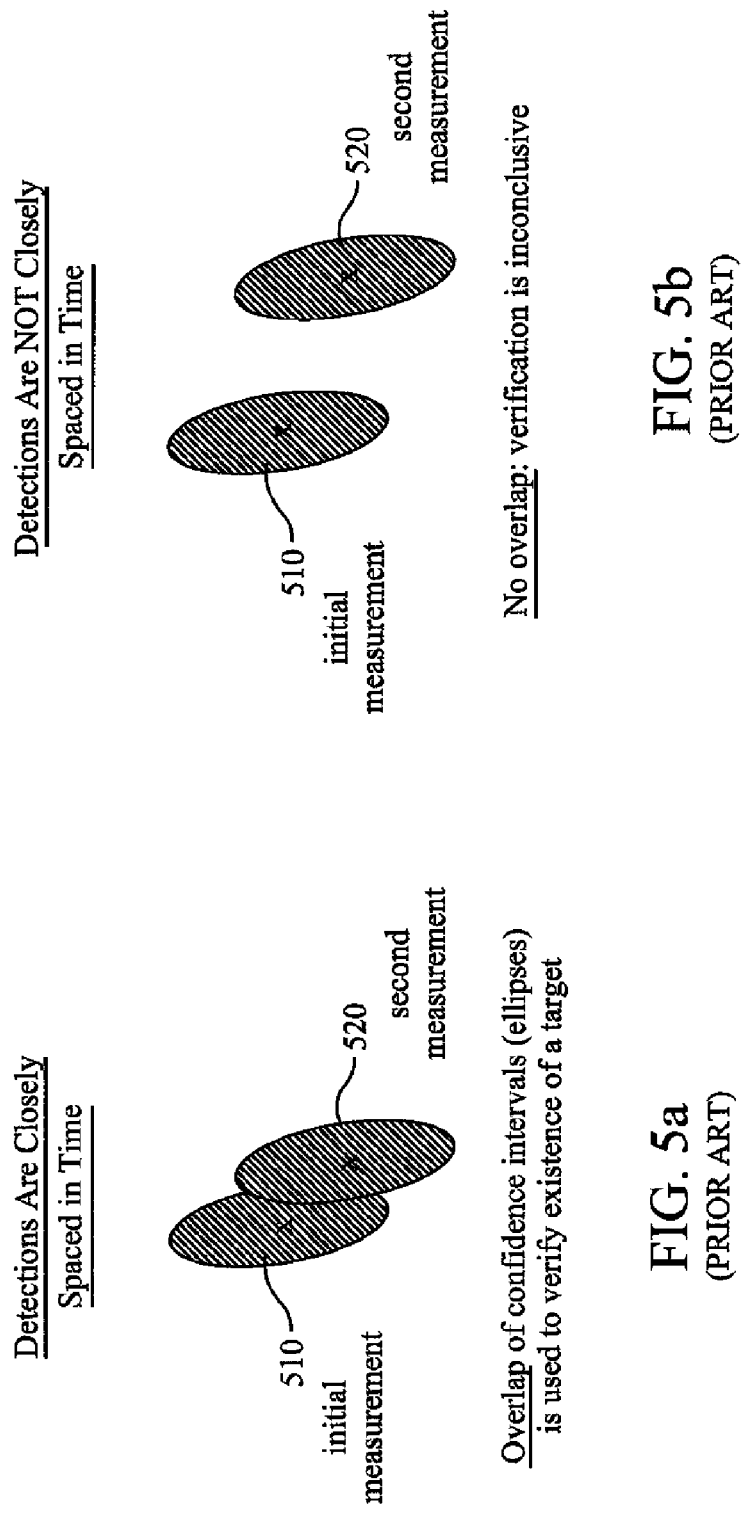
FIG. 5a shows exemplary target verifications using two detections for targets closely spaced in time.
FIG. 5b shows exemplary target verifications using two detections for targets that are not closely spaced in time.
Figure 7B:
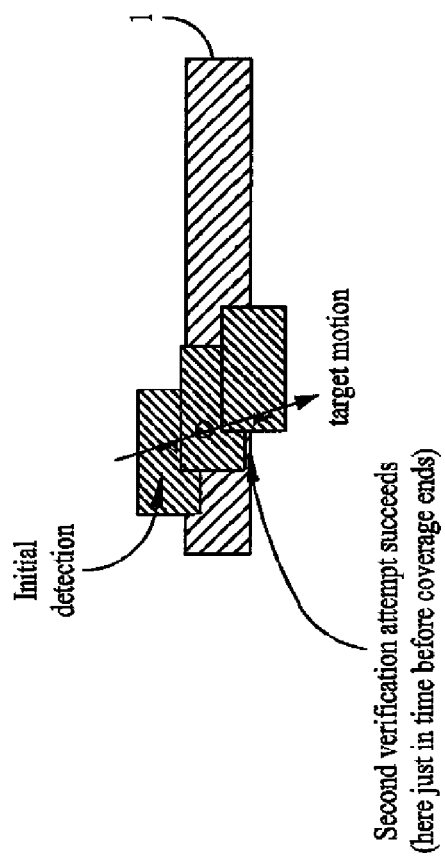
FIG. 7 a-b illustrates an embodiment of the present invention for a radar antenna that is both rotating and fully electronically scanned.
Figure 7A:
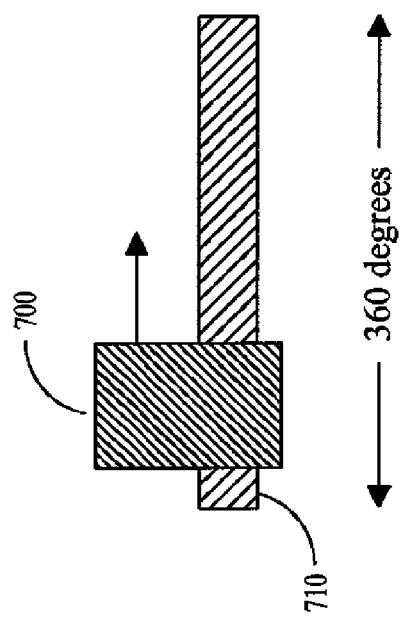

FIG. 7a-b illustrates one embodiment of the present invention for a radar antenna that is both rotating and fully electronically scanned. The present method of operation determines the initial track having sufficient predictive validity for this class of radars. FIG. 7a illustrates that as with other fully electronically scanned antennas there is a much wider instantaneous field of view 700 available for seeing a target, but it also illustrates that its opportunity for seeing a target does not last long in terms of the mission for which the radar is directed since the antenna is rotating constantly to cover the full 360 degree area 710. For example, the instantaneous filed of view may be sized to be 90 degrees. FIG. 7b illustrates that until the radar's electronically scanned field of view rotates away from the target, there are more opportunities to detect the target than in the rotating-only case FIG. 1; however, this time period for detection does not last as long as in the staring-only case shown in FIG. 2.

Figure 6:
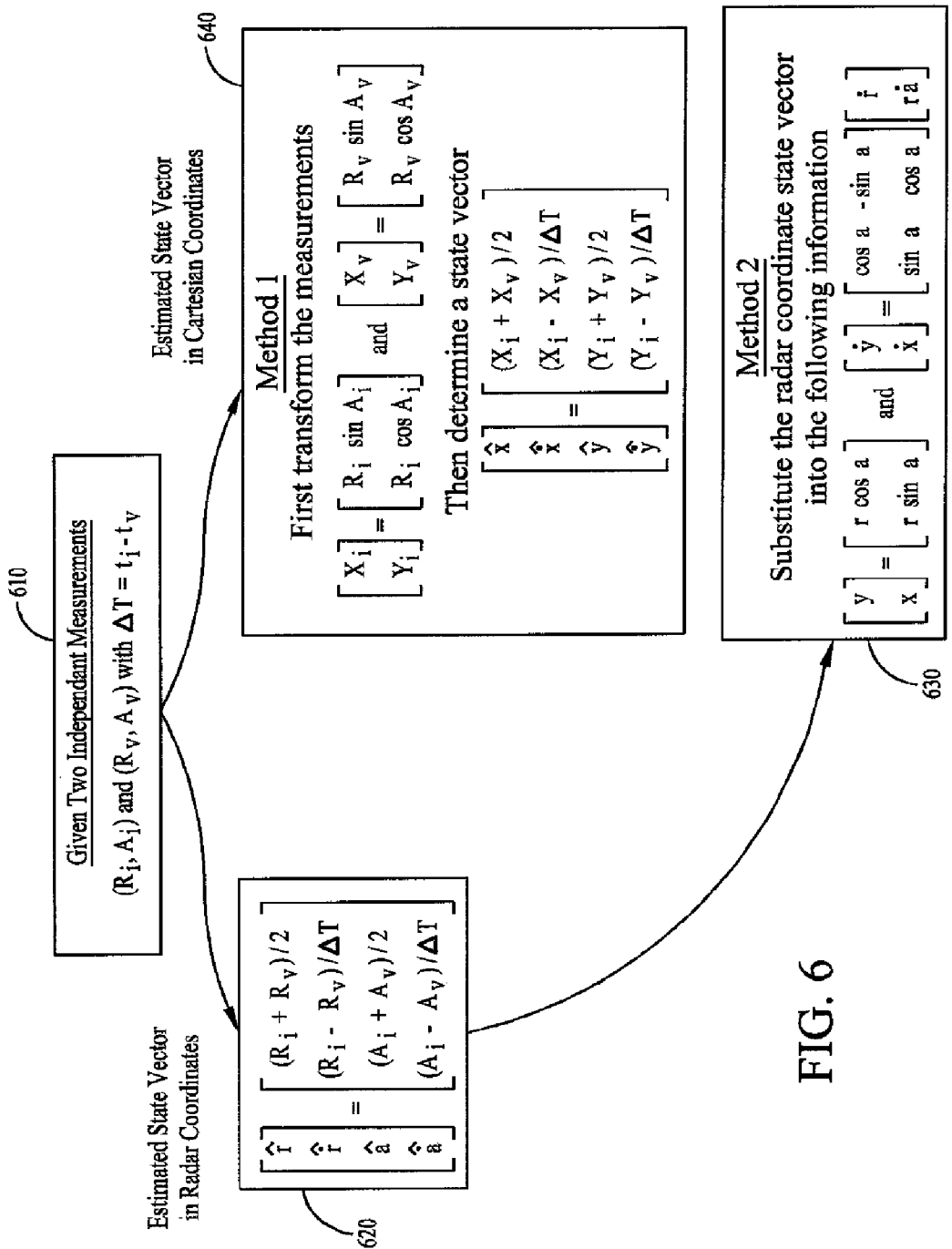
FIG. 6 shows the prior art measurements and estimated state vector coordinates in radar and Cartesian coordinates, respectively.

As previously discussed, when two detections are used for verifying the existence of a target, which detections are from the same scan of a conventional rotating radar, then the time separation between them is likely be too small to yield sufficient predictive validity to the state vector of the initial-track. That is, $\Delta T \approx 0$ in the equation shown in FIG. 6. The use of several scans worth of detections would increase the value of $\Delta T$, but such a delay would not be acceptable when using an antenna that is both fully electronically scanned and rotating. In this case the radar is capable of immediately verifying the existence of the target and reporting the existence of a new threat within the same scan (rotation period of the electronically scanned antenna). If the radar reports the existence of a new target, it may also determine the state vector of its initial-track. If the state vector does not have sufficient predictive validity, the next time the target is detected and verified it will likely be re-reported, but as a new target. A radar antenna that rotates and is fully electronically scanned can wait until the target is about to leave the rotating field of view of the antenna, in which case the radar can electronically scan back to see the target so that the time separation between the first detection and last verification detection is larger. The consequence of now having more time to verify the existence of the target is that the unknown motion of the target will begin to become apparent.

For example, if a target were first detected near the broadside of the antenna, where the sensitivity is usually the greatest, and if the electronically scanned antenna has a ninety-degree field of view and rotates about seven times a minute (7 RPM), then the last verification detection, $\Delta T$, could occur up one second later—in fact, were the target detected at the leading edge of the rotating field of view and verified at the trailing edge then there could be up to two seconds of separation between the two detections.

By way of example and not limitation one embodiment of the present invention is a method for determining the initial-track of a target in two dimensions, using only detections from the same scan or rotation period of its antenna). The initial detection provides a pair of measurement components for range and azimuth, $(R_i, A_i)$, and the second detection provides a second pair of measurement components, $(R_v, A_v)$, which two detections serve to verify the existence of a target when their components satisfy Equation 1, but here they also need to support the determination of an initial-track having sufficient predictive validity.

Figure 8:
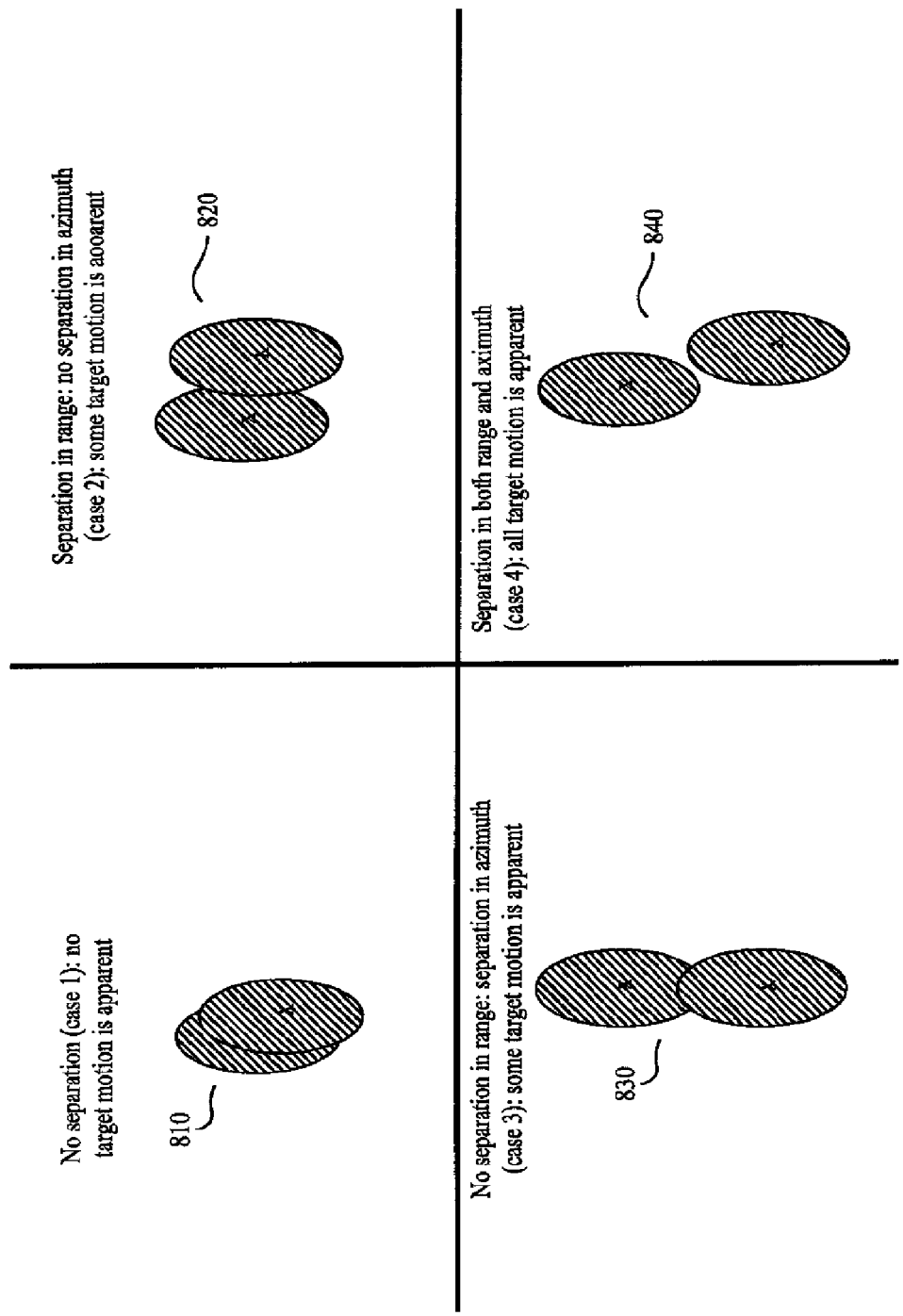
FIG. 8 illustrates the confidence interval relationships between two detections that are closely spaced in time (two-dimensional specimen example) in accordance with one embodiment of the present invention.

For this two-dimensional, two-detection example, FIG. 8 illustrates that during the additional waiting time that is afforded by having the much wider electronically scanned field of view, the effect of target motion begins to become apparent. There are, however, four possible realizations for the spatial separation between the position confidence intervals associated with the initial and last detections i.e., either they will overlap in both components (810), overlap in only one (820, 830), or will not overlap at all (840).

This invention seeks to determine the set of possible realizations of the position confidence intervals to define the structures for any state vector of the initial-track. Here the form of the state vector is not predetermined to be either that of the CP or CV varieties. A method of the present invention determines (1) which state vector structure among all possible structures is optimum by examining the spatial relationships between detections, but at the component level, and (2) determines the optimum state vector for each component interdependently of the others. The structure of the state vector of the initial-track is (3) composed after determining the optimum component state vector for each independent kinematic degree of freedom such as range and azimuth. For the example having only two detections in two dimensions, all the forms of the possible state vectors are easily shown to be those in FIG. 9, which corresponds to the four possible confidence interval realizations illustrated above in FIG. 8.

In one embodiment of the present invention each measurement component sequence and its associated set of variances is used to determine if there is any motion of the target that is apparent in that given degree of freedom. The method for determining whether such motion is apparent is generic for each degree of freedom an includes the steps of (1) Representing a given sequence of acquired measurement components and the corresponding set of variances by a generic sequence $(\xi_1, \xi_2, \ldots, \xi_K)$ and its associated set $\{\sigma_\xi^2(k): k=1, 2, \ldots K\}$; (2) determining whether there is any motion of the target is apparent in the given sequence of component measurements. It first determines whether a CP or a CV model is more appropriate for that particular set of components by invoking a test that is similar to the verification test, but this takes place at the component level and has the sense of its inequality reversed. Specifically, the decision that there is apparent motion in the given sequence of components is expressed algebraically as $$\frac{(\xi_1 - \xi_K)^2}{\sigma_\xi^2(1) + \sigma_\xi^2(K)} > \delta^2 \qquad \text{Equation 12}$$

The decision threshold in Equation 12 is a parameter whose value is specified for a given implementation. By way of example and not limitation $\delta^2=4$ would represent a generic "two-sigma" test. If Equation 12 is not satisfied then the method concludes that the optimum kinematic model for that component is the CP one, in which case the component state vector is determined by a weighted average of the component data, written here together with its variance as $$\hat{x}^{(CP)} \equiv \hat{x} = P^{(CP)} \sum_{k=1}^{K} \frac{\xi_k}{\sigma_\xi^2(k)} \text{ and } P^{(CP)} \qquad \text{Equation 13}$$

$$\equiv \sigma_x^2 = \left( \sum_{k=1}^{K} \frac{1}{\sigma_\xi^2(k)} \right)^{-1}$$

On the other hand, if Equation 12 is satisfied then the method concludes that the better kinematic model for the given set of components is CV (unless a CA model is also under consideration, in which case an additional test would be performed to decide whether the CV model or CA model were better. When the CV model is chosen then the component state vector and its associated covariance matrix is determined by a least-squares-type estimator for that component, which is valid at the centroid of the measurement times. Letting $\tau_k \equiv t_k - t_1$, the component state vector and its associated state vector for the for the CV case are $$\hat{x}^{(CV)} \equiv \begin{bmatrix} \hat{x} \\ \hat{\dot{x}} \end{bmatrix} = P^{(CV)} \sum_{k=1}^{K} \begin{bmatrix} 1 \\ \tau_k \end{bmatrix} \frac{\xi_k}{\sigma_\xi^2(k)} \qquad \text{Equation 14}$$

$$P^{(CV)} \equiv \begin{bmatrix} \sigma_x^2 & \sigma_{x\dot{x}} \\ \sigma_{x\dot{x}} & \sigma_{\dot{x}}^2 \end{bmatrix} = \left( \sum_{k=1}^{K} \sigma_\xi^2(k) \begin{bmatrix} 1 & \tau_k \\ \tau_k & \tau_k^2 \end{bmatrix} \right)^{-1} \qquad \text{Equation 15}$$

If a CA model is also included in the set of possibilities then when Equation 12 is satisfied and K>3 an additional test is performed to decide whether the CV model or CA model is better for the given component set measurements. To test if there is sufficient apparent motion to warrant use of a CA model the process first examines the components to find the first index, say k', such that $$\frac{(\xi_1 - \xi_{k'})^2}{\sigma_\xi^2(1) + \sigma_\xi^2(k')} > \delta^2. \qquad \text{Equation 16}$$

Then, if k'<K, a second test is performed to determine if testing for acceleration is warranted, namely, $$\frac{(\xi_{k'} - \xi_K)^2}{\sigma_\xi^2(k') + \sigma_\xi^2(K)} > \delta^2. \quad \text{Equation 17}$$

When both Equation 16 and Equation 17 are satisfied then the test for apparent acceleration is warranted. This test is of the same form (written here with the commonly used assumption of identically distributed measurement errors):

$$\frac{[(\xi_1 - \xi_{k'})^2 / \tau_{k'}^2 - (\xi_{k'} - \xi_K)^2 / (\tau_K - \tau_{k'})^2]^2}{2\sigma_\xi^2 / \tau_{k'}^2 + 2\sigma_\xi^2 / (\tau_K - \tau_{k'})^2} > \delta^2. \quad \text{Equation 18}$$

If Equation 18 is satisfied then acceleration is apparent in the data and the CA model is appropriate for representing this component sequence of measurements, otherwise the CV model is used, namely Equation 14 and Equation 15. When the CA model is chosen the component state vector and its associated covariance matrix are determined as:

$$\hat{x}^{(CA)} \equiv \begin{bmatrix} \hat{x} \\ \hat{\dot{x}} \\ \hat{\ddot{x}} \end{bmatrix} = P^{(CA)} \sum_{k=1}^{K} \begin{bmatrix} 1 \\ \tau_k \\ \tau_k^2/2 \end{bmatrix} \frac{\xi_k}{\sigma_\xi^2(k)} \quad \text{Equation 19}$$

$$P^{(CA)} \equiv \begin{bmatrix} \sigma_x^2 & \sigma_{x\dot{x}} & \sigma_{x\ddot{x}} \\ \sigma_{x\dot{x}} & \sigma_{\dot{x}}^2 & \sigma_{\dot{x}\ddot{x}} \\ \sigma_{x\ddot{x}} & \sigma_{\dot{x}\ddot{x}} & \sigma_{\ddot{x}}^2 \end{bmatrix} \quad \text{Equation 20}$$

$$= \left( \sum_{k=1}^{K} \sigma_\xi^2(k) \begin{bmatrix} 1 & \tau_k & \tau_k^2/2 \\ \tau_k & \tau_k^2 & \tau_k^3/2 \\ \tau_k^2/2 & \tau_k^3/2 & \tau_k^4/4 \end{bmatrix} \right)^{-1}$$

Now recall that in two dimensions the test as to whether or not a second detection verifies the first one is given by Equation 1 and Equation 2. When two detections are so determined to be associated, then the methods of the invention applies a similar test, but with the sense of the inequality sign reversed, and the test is applied separately to the components of each independent degree of freedom.

Figure 10A:
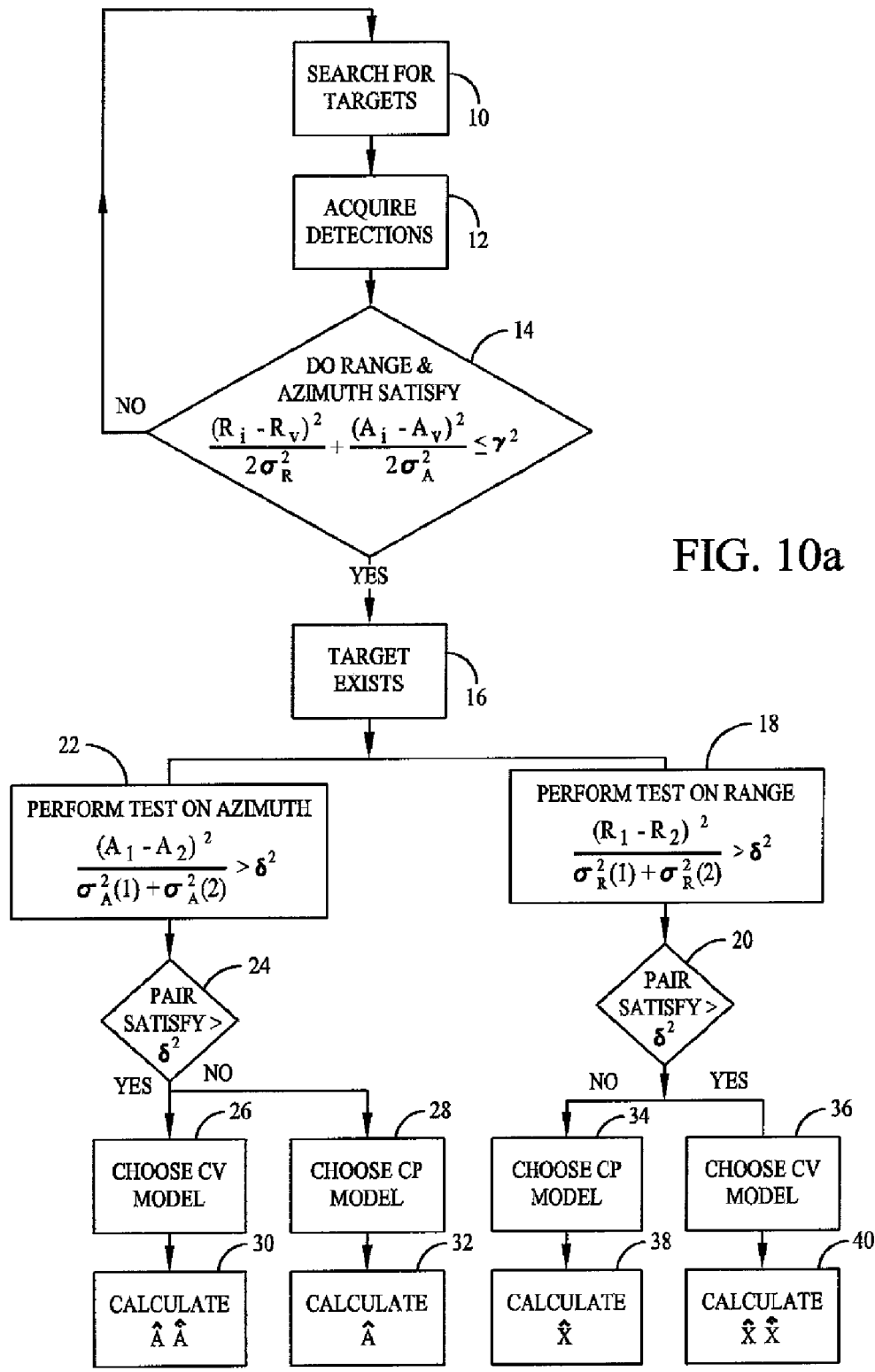
FIG. 10a illustrates a flow chart block diagram in accordance with one embodiment of the present invention

The flow chart in FIG. 10a serves by way of example and not limitation as a method of determining which model to apply upon acquiring range an azimuth data. The rotating electronic scanning radar searches for targets 10 and upon the detection of two targets 2 calculates whether the targets satisfy Equation 1, with an outcome as to whether the detections verify the existence of a target. In the event that the verification test does not satisfy Equation 1 then the process returns to the rotating electronic scanning radar searching for targets 10. If the verification test does satisfy Equation 1 then the process determines the existence of a target 16 and proceeds to determine what model should apply: CP or CV for both range and azimuth. In step 18 the process performs a test using Equation 12 wherein the decision that there is apparent motion in the given sequence of components is expressed algebraically.

For the case where range is the parameter, ξ is the range variable R. Where two detections are acquired by the rotating electronic scanning radar K is set to 2. If step 20 indicates that the test yields a result greater than a pre assigned $\delta^2$ then the process chooses CV model 36 and proceeds to estimate both the range and the rate of range change a method of least squares well know to those skilled in the art. If step 20 indicates that the test yields a result lesser than a pre assigned $\delta^2$ then the process chooses CP model 34 and proceeds to estimate the range using a weighted average well know to those skilled in the art.

Likewise, if the verification test does satisfy Equation 1 then the process determines the existence of a target 16 and proceeds to determine what model should apply: CP or CV for azimuth. In step 22 the process again performs a test using Equation 12 wherein the decision that there is apparent motion in the given sequence of azimuthal components. For the case where azimuth is the parameter, ξ is the range variable A. Where two detections are acquired by the rotating electronic scanning radar K is set to 2. If step 24 indicates that the test yields a result greater than a pre assigned $\delta^2$ then the process chooses CV model 26 and proceeds to estimate both the azimuth position and the rate of azimuthal change using a method of least squares. If step 24 indicates that the test yields a result lesser than a pre assigned $\delta^2$ then the process chooses CP model 34 and proceeds to estimate the azimuthal position using a weighted average.

FIG. 10b illustrates the component level tests and the four possible outcomes, which respectively correspond to the cases in FIG. 8 and FIG. 9. The outcome of the two component level tests determines the best structure of the respective component-level state vector, one for range and one for azimuth. Choosing a state vector structure, which is equivalent to choosing a kinematical model, independently for each component is valid since each degree of freedom of motion is mutually independent and furthermore the respective errors in each measurement component are statistically independent.

For example, if in a given realization there is no apparent separation between the two range measurement confidence intervals that are being examined, then a CP model has greater validity for the range component than a CV model. The azimuth component can still have either a CP or CV component model, depending on the true separation between the two azimuth measurement confidence intervals.

In the above example there are only four possible state vectors for the initial-track. Were there to be three detections instead of just the two then a constant acceleration (CA) model could be considered along with the CP and CV ones. With three detections and two degrees of freedom there would then be nine possible state vectors—and the possible dimensions of the state vector of the initial track would range from two to six. With three degrees of freedom there would be eight possible geometric relationships between the confidence intervals of two detections (overlapping or not in range, elevation, and azimuth) and, hence, there would be six possible dimensions for state vectors. With three detections and three degrees of freedom there would be twenty seven possible state vectors—and the possible dimensions of the state vector of the initial track would range from three to nine. Finally, one embodiment of the present invention immediately generalizes to higher kinematical orders, i.e. if four detections were available then a constant jerk (CJ) model would be possible, which in three degrees of freedom would lead to sixty-four possible state vectors—and the possible dimensions of the state vector of the initial track would range from three to twelve. Computational complexity grows when more detections are added and higher kinematical orders are considered.

The calculations can be rearranged, however, so that the computational complexity is bounded by the number of degrees of freedom and the highest order kinematical model being considered. The case of having an arbitrary number of detections and kinematical orders of CP, CV, and CA is most common, but in practice the choice of degrees of freedom and the kinematical orders to consider will be design choices and a consequence of the true number of detections that the radar has available for determining the initial-track.

Figure 11:
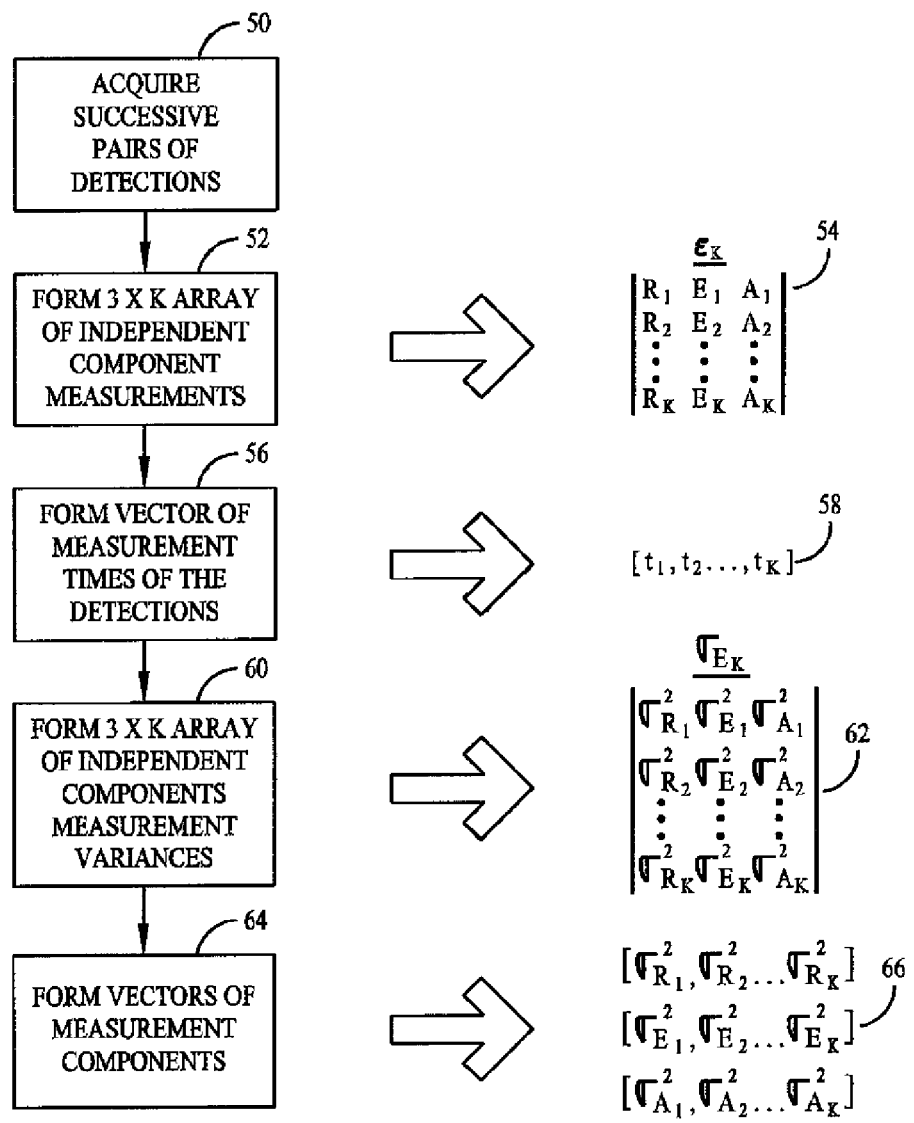
FIG. 11 illustrates a flow chart block diagram in accordance with one embodiment of the present invention.

The general set of K initial detections that have been determined to be associated with the same object, i.e. Equation 7 has been satisfied by each successive pair of detections. As illustrated in FIG. 11, a method of the present invention acquires successive pairs of detections 50 to form various arrays and vectors utilized in the selection of CP, CV, CA. Each detection provides a triad of statistically independent component measurements for range, elevation and azimuth, $(R_k, E_k, A_k)$, k=1, 2,..., K, and possibly range rate and arranges 52 the measurements into an array 54. Each detection provides the respective measurement times of the detections, to form vectors 56 and arranged 58 as $t_1, t_2, \ldots, t_K$, having their indices so ordered such that the sequence of measurement times is monotonically increasing. Each detection has an associated confidence interval (ellipsoid), which is defined by the measurement component triad and their respective variances, $((\sigma_R^2(k), \sigma_E^2(k), \sigma_A^2(k))$, k=1, 2, ..., K and formed 60 as an array of components as arranged 62 in the form of a matrix. Such a set of associated detections allows one to define three independent sequences of measurement components, $(R_1, R_2, \ldots, R_K)$, $(E_1, E_2, \ldots, E_K)$, and $(A_1, A_2, \ldots, A_K)$. For each of these measurement component sequence there are three corresponding sets of measurement variances, $\{\sigma_R^2(1), \ldots, \sigma_R^2(K)\}$ for range, and $\{\sigma_E^2(1), \ldots, \sigma_E^2(K)\}$ and $\{\sigma_A^2(1), \ldots, \sigma_A^2(K)\}$ respectively for elevation and azimuth formed 64 as vectors 66.

An example, but not limited thereto of the foregoing, is that after independently applying the above generic methods to each of range, elevation, and azimuth component measurement sequences and their associated sets of variances, assume that the best component state vectors are determined to be CA in range, CV in elevation, and CP in azimuth e.g., such an outcome is typical when the target is a distant ballistic missile that is rising and incoming to the radar. The respective component state vectors would then be $\hat{r}^{(CA)}$, $\hat{e}^{(CV)}$, and $\hat{a}^{(CP)}$, respectively instantiated via Equation 19, Equation 14, and the first part of Equation 13; and their associated covariance matrices would be $P_r^{(CA)}$, $P_e^{(CV)}$, and $P_a^{(CP)}$, respectively instantiated via Equation 20, Equation 15, and the second part of Equation 13. One embodiment of the present invention then uses the individual component state vectors and their associated covariance matrices to compose the best initial state vector for the initial-track:

$$\begin{bmatrix} \hat{r}^{(CA)} \\ \hat{e}^{(CV)} \\ \hat{a}^{(CP)} \end{bmatrix} \equiv \begin{bmatrix} \hat{r} \\ \hat{\dot{r}} \\ \hat{\ddot{r}} \\ \hat{e} \\ \hat{\dot{e}} \\ \hat{a} \end{bmatrix} \quad \text{Equation 21}$$

$$\begin{bmatrix} P_r^{(CA)} & 0 & 0 \\ 0 & P_e^{(CV)} & 0 \\ 0 & 0 & P_a^{(CP)} \end{bmatrix} \equiv \begin{bmatrix} \sigma_r^2 & \sigma_{r\dot{r}} & \sigma_{r\ddot{r}} & 0 & 0 & 0 \\ \sigma_{r\dot{r}} & \sigma_{\dot{r}}^2 & \sigma_{\dot{r}\ddot{r}} & 0 & 0 & 0 \\ \sigma_{r\ddot{r}} & \sigma_{\dot{r}\ddot{r}} & \sigma_{\ddot{r}}^2 & 0 & 0 & 0 \\ 0 & 0 & 0 & \sigma_e^2 & \sigma_{e\dot{e}} & 0 \\ 0 & 0 & 0 & \sigma_{e\dot{e}} & \sigma_{\dot{e}}^2 & 0 \\ 0 & 0 & 0 & 0 & 0 & \sigma_a^2 \end{bmatrix} \quad \text{Equation 22}$$

The outcome of a method of the invention is that the state vector for the initial-track is composed of component state vectors, and which has the best predictive validity of all possible state vectors for the given set of detections. Observe that the form of the equations used for the state vectors of the respective CP, CV, and CA models, Equation 13, Equation 14, and Equation 19, contains a nested set of common upper sub vectors (and also the equations for the associated covariance matrices contain a nested set of common upper-left sub matrices, see Equation 13, Equation 15, and Equation 20 respectively), which fact can be used to reduce the total number of redundant calculations should it be determined that it were beneficial for purposes of initiating tracking to explicitly determine all the possible state vectors.

The methods discussed above implicitly consider all possible component-level state vectors, but only computes one each for each independent component. If the respective component models are over determined, as in the least squares sense, then the same chi-squared type test that is used to determine whether motion is apparent or not can also be use to edit the data so as to remove outliers. Although each component in the triad of measurements from a given detection is used in the basic association test, all components in that triad need not be used in determining the value of the components in the "best state vector". In fact, if there are several associated detections whereby the best model for a given component is over determined, the values closest to the mode, rather than to the mean, can give more robust values for the estimated components of the state vector of that set of measurement components. For example, with a monopulse radar, range and range rate measurements may be available for determining the initial value of the best component-level state vector for the range degree of freedom, and the range rate component data can also serve to reinforce the statistical significance in the test for apparent motion. In contrast, the monopulse angle measurement test may exclude a component having a larger signal to noise ratio.

Figure 12A:
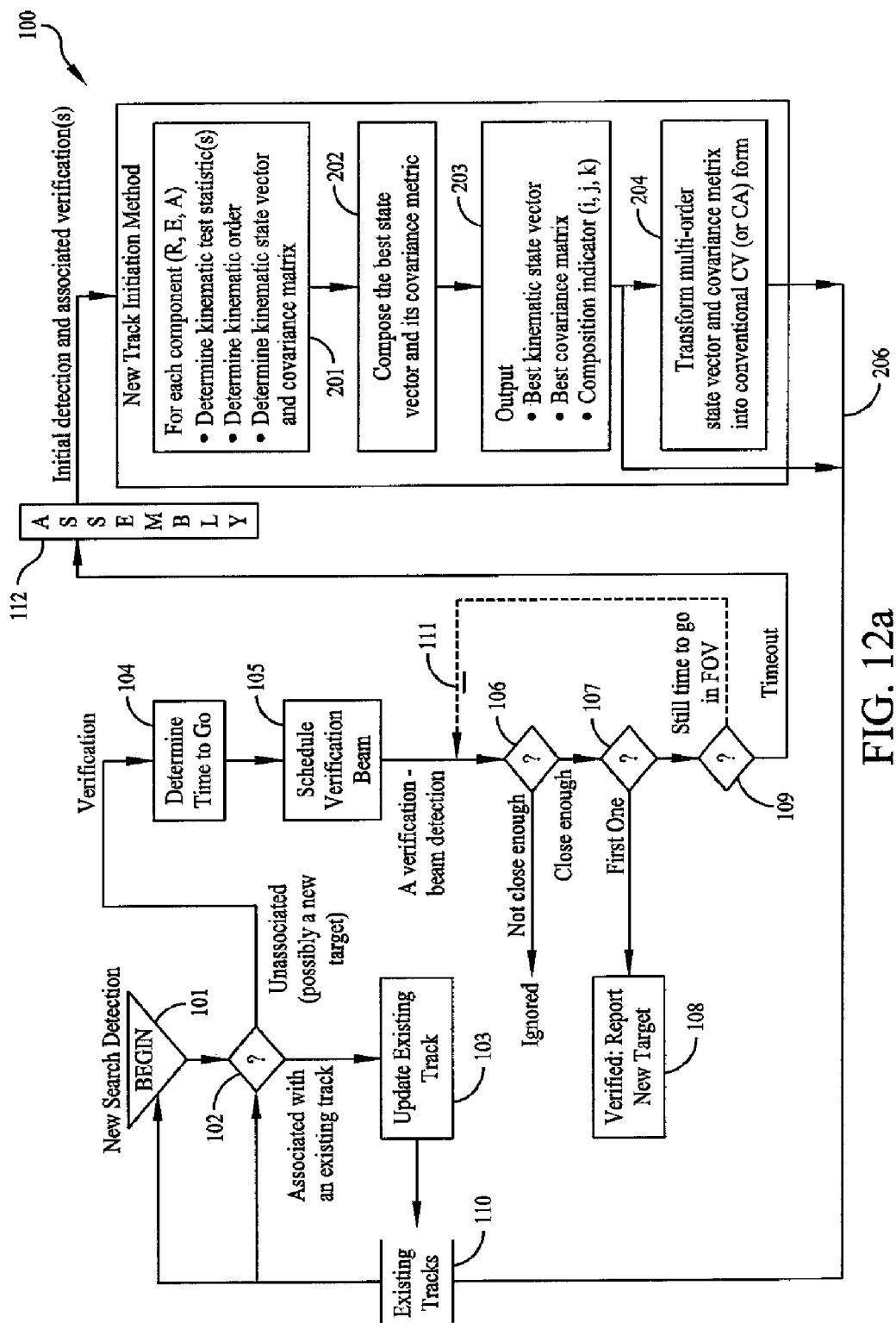
FIG. 12a illustrates a flow chart block diagram in accordance with one embodiment of the present invention
Figure 12B:
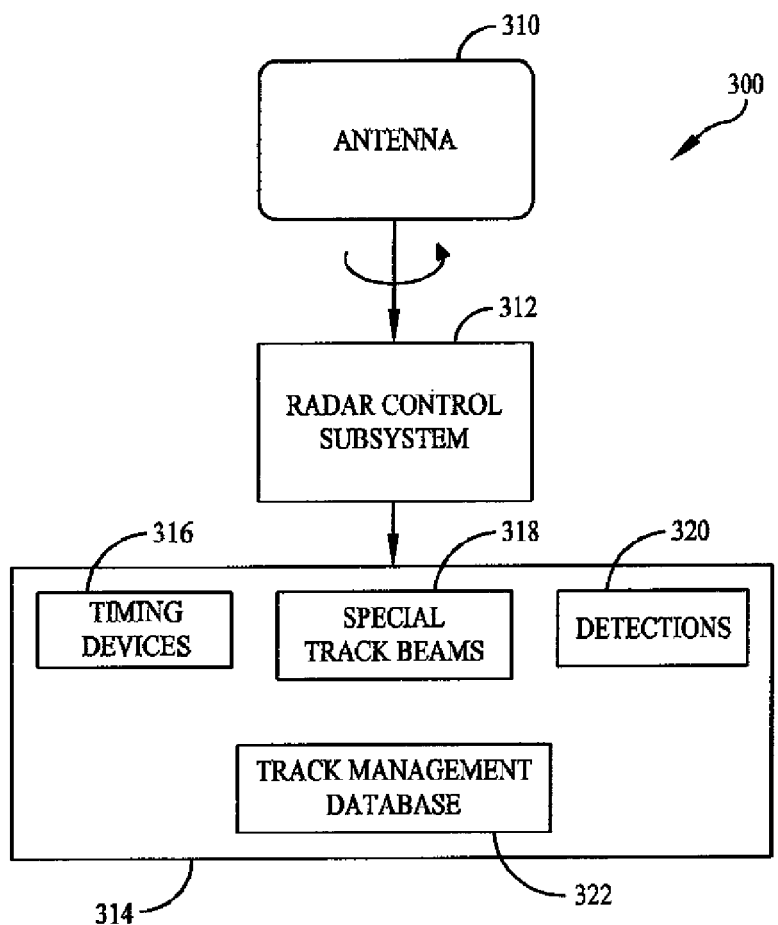
FIG. 12b illustrates a radar system block diagram in accordance with one embodiment of the present invention

In FIG. 12a illustrates a process 100 of one embodiment of the present invention. FIG. 12b illustrates a radar system 300 comprising conventional components of a rotating and electronically scanned radar including the radar control sub system 312 that provides transmission of the beam, beam steering, and reception processing, target detection, and processes in accordance with radar process 100. The blocks 101-109 comprise the process associated with potential target detections, managing track files, and scheduling radar beams. The blocks 210, 202, 203 and 204 comprise the process of determining the state vector and its associated covariance matrix of the initial track using one scan's worth of detections. The output 206 from block 203 or optionally from block 204 comprise the data representing the initial tracks that have sufficient predictive validity. The output 206 represents existing tracks 110 so that the radar can report new targets as soon as they are first detected and verified (within one rotation of its antenna) and can carry on its primary functions of surveillance and tracking.

At block 101 the radar system 300 transmits energy in a beam for the purpose of detecting the presence of a target. When searching for new targets the beams from antenna 310 are pointed in elevation and azimuth according to some predetermined, static template, and detections 320 from those surveillance beams will serve to update existing tracks of known targets. In addition to the predetermined beams, special track beams 318 may also be steered to where a known target is expected to be, in which case if it is detected then the measurements (range, elevation, and azimuth) are likely to be more accurate than when using only a static beam template.

Block 102 is a first decision step in the overall surveillance and tracking radar system 300 dealing with a determination whether a given detection associates with a known target, in which case its track may be updated; if not then it may be a new target. Block 103 embodies a step of updating a track with its associated detection. Blocks 104 through 109 embody a verification step of a new, unassociated detection, dubbed here a seminal detection. First it determines whether there is still time within the same scan (rotation period of the antenna) to verify the seminal detection. To determine the time to go, either software timing algorithms or hardware timing devices 316 are employed, both methods well know in the art of software and electronic engineering. Time to go (TTG) is defined as the time remaining before the boundary of the electronically scanned field of view rotates past the location of the seminal detection. If sufficient TTG remains, then a radar beam scheduler 316 is notified 105 and a beam (or more, depending on TTG remaining) is transmitted via antenna 310 toward the location of the seminal detection. Block 106 determines if a detection in one or more of the verification beams is sufficiently close to the seminal detection, in which case the seminal detection is deemed to be verified. If this is the first verification detection and multiple verification beams were scheduled in this scan then at step 107 the process reports that the new unknown target has now been detected and verified in step 108. If a detection in a verification beam does not associate with the seminal detection step 106, it might still be possible to associate it with an existing track, or it could be of another new target, but in either case it is deemed irrelevant and ignored in determining the initial track for a verified seminal detection. Block 109 determines if there is still TTG remaining in the allotted schedule for verifying the seminal detection, in which case the process continues to loop 111 seeking additional verification detections. When the timeout occurs denoted as when TTG times out, then if the seminal detection has been verified the process exits Block 109 and the associated detections are assembled 112 (e.g. compiled, ordered, etc.) and the process proceeds to determine the initial-track of the new target.

At block 201, the process uses the set of associated detections of the new target that have been obtained during the initial scan (antenna 310 rotation) of the new target. There are $K \geq 2$ detections, with each detection comprising a set of measurements on the location of the detection, with their associated confidence intervals. In three dimensions each detection provides range, elevations, azimuth measurements, and optionally range rate (Doppler). The measurement components are denoted as a triad, $(R_k, E_k, A_k)$, k=1, 2, ..., K. Associated with each detection is its confidence interval, $(\sigma_R^2(k), \sigma_E^2(k), \sigma_A^2(k))$, which values are determined by the radar system 300 using a standard process, such as the signal to noise (or background) ratio of its detection.

At block 201 a process commences for the set of associated detections at the individual component level, using the methods and algorithms as previously described. With three degrees of freedom (range, elevation, and azimuth) and with at least two detections, there are eight possible state vectors. If there are more than two detections then there are at least twenty-seven different state vectors (limiting the number of possible kinematical models to three, i.e., constant position, constant velocity, and constant acceleration). In order to describe all the possible state vectors that are considered in block 201, a notation is used, which here is invoked using a discrete point space, dubbed the "possible state vector space". The relevant subset of points (representing the possible state vectors) for the three degrees of freedom and set of three kinematical orders, is illustrated below in FIG. 13. To reduce the clutter in the figure not all of the relevant points are labeled. The set of all possible state vectors and their associated covariance matrices are then enumerated and indexed according to the indices of the points in the discreet point space.

Figure 13:
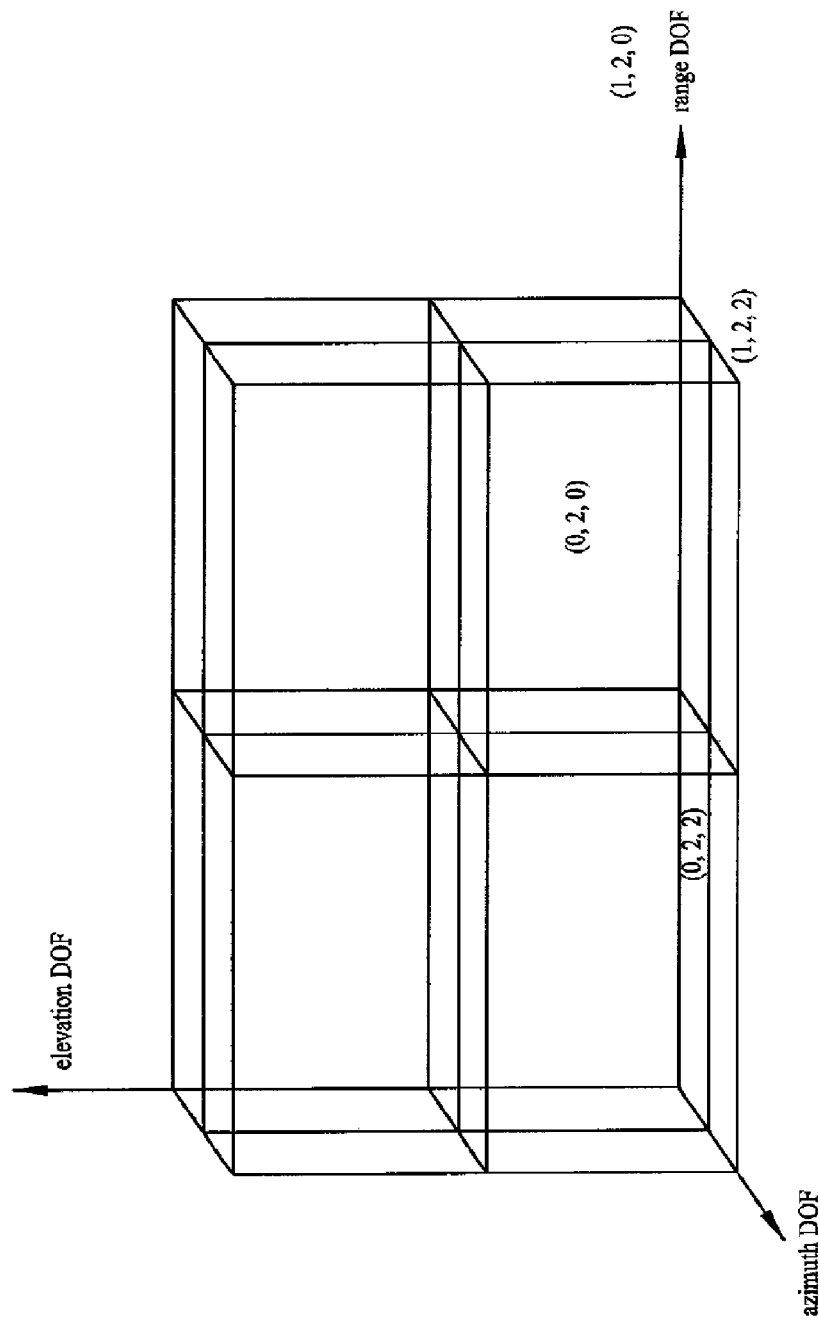
FIG. 13 illustrates state vectors in accordance with one embodiment of the present invention.

In FIG. 13 each coordinate axis corresponds to a particular degree of freedom, respectively corresponding to range, elevation, and azimuth (a two-degree of freedom case, for example, a range-azimuth radar that is used for maritime surveillance and tracking would have only range and azimuth axes and hence be represented by a square rather than by a cube). The discreet points in the abstract space of all possible state vectors are denoted by a triad (i, j, k), with i=0, 1, 2 and similarly for j and k. The value of the index for each component refers to a given kinematic order: by definition, constant position (CP) is a zeroeth-order kinematic model; constant velocity (CV) is a first-order kinematic model; and constant acceleration (CA) is a second-order kinematic model. This notation simplifies the enumeration of all possible state vectors. The set of all possible kinematic outcomes for a given component is accordingly mapped to the indices 0, 1, and 2 along each axis in FIG. 13 (if a constant jerk (CJ) model were also considered then the cube would be expanded; an index value of 3 would be appended to each axes of the discrete space of all possible state vectors). The possible component state vectors for the range component are denoted along the range degree of freedom axis as $r^{(CP)}, r^{(CV)}, r^{(CA)}$, respectively corresponding to indices along that axis of i=0, 1, 2. Similarly, the possible elevation component state vectors are denoted along the elevation degree of freedom axis as $e^{(CP)}, e^{(CV)}, e^{(CA)}$, having indices along that axis of j=0, 1, 2. And finally, the possible azimuth component state vectors are denoted along the azimuth degree of freedom axis as $a^{(CP)}, a^{(CV)}, a^{(CA)}$, having indices along that axis of k=0, 1, 2. The totality of all possible state vectors is then the set of twenty-seven elements consisting of the triads {(i, j, k):i=0, 1, 2 j=0, 1, 2; k=0, 1, 2}. Note that the value of a particular sub-index in the discrete space of all possible state vectors is equal to the kinematical order of its corresponding component state vector. Similarly, the respective covariance matrices that correspond to each possible state vector are also so indexed.

In FIG. 12a, the step 202 composes the state vector of the initial-track using the individual component state vector of each degree of freedom. The complete enumeration of the CP, CV, and CA state vectors for the respective degrees of freedom are summarized below in Table 1 (with the vectors written out as row vectors). The selection of the one for each respective degree of freedom is made with respect to the its particular underlying sequence of component measurements using the methods described previously, which leads to a particular triad of values for i, j, and k, each independently arrived at, but once determined are collectively denoted as (i, j, k), a definite (the best) point in the abstract space of all possible state vectors for the given set of detections. The determination the initial-track then follows the instantiation of each state vector of each individual component (and their associated covariance matrices). For example, the structure of the composite state vector that had been exhibited in Equation 21, ($r^{(CA)}$, $e^{(CV)}$, $a^{(CP)}$), corresponds to the point (2, 1, 0) in the abstract discreet space of all possible state vectors. Thus a particular triad, (i, j, k), is the composition indicator of (204) in FIG. 13, and implies which of all the possible state vectors is the one that has the best predictive validly.

The state vector of the initial track and its associated covariance matrix are provided to the track management database 322 in step 110, which then allows future detections to be correctly associated at step 102 using these state vectors that have the sufficient predictive validity, also to enable the radar system 300 to more accurately point its future special tracking beams 318 in step 101 with the result being a greater

TABLE 1

Enumeration of possible structures for component state vectors

| INDEX | RANGE AXIS | ELEVATION AXIS | AZIMUTH AXIS |
|---|---|---|---|
| 0 | i = 0: $r^{(CP)} = r$ | j = 0: $e^{(CP)} = e$ | k = 0: $a^{(CP)} = a$ |
| 1 | i = 1: $r^{(CV)} = (r, \dot{r})$ | j = 1: $e^{(CV)} = (e, \dot{e})$ | k = 1: $a^{(CV)} = (a, \dot{a})$ |
| 2 | i = 2: $r^{(CA)} = (r, \dot{r}, \ddot{r})$ | j = 2: $e^{(CA)} = (e, \dot{e}, \ddot{e})$ | k = 2: $a^{(CA)} = (a, \dot{a}, \ddot{a})$ |

Whereas here the structure of the state vector of a given initial-track is not predetermined as it is in conventional methods, and hence its dimension here is not predetermined, the step in block 204 provides an optional step whereby the state vector and its associated state vector are transformed into a conventional state vector if such is needed for subsequent use in a conventional track maintenance algorithm. The process consists of either projecting each particular component state vector down into the desired conventional form or embedding it up into the desired conventional form. In the former case higher kinematical terms are truncated while in the latter case the higher kinematical terms are defined as zero. For example, the composite state vector of the specimen example exhibited in Equation 21, ($r^{(CA)}$, $e^{(CV)}$, $a^{(CP)}$), is respectively transformed into conventional CP, CV, and CA state vectors (3-state, 6-state, and 9-state) as follows $$\text{Into conventional } CP: \begin{bmatrix} \hat{r}^{(CA)} \\ \hat{e}^{(CV)} \\ \hat{a}^{(CP)} \end{bmatrix} \equiv \begin{bmatrix} \hat{r} \\ \hat{\dot{r}} \\ \hat{\ddot{r}} \\ \hline \hat{e} \\ \hat{\dot{e}} \\ \hline \hat{a} \end{bmatrix} \Rightarrow \begin{bmatrix} \hat{r} \\ \hat{e} \\ \hat{a} \end{bmatrix} \quad \text{Equation 23}$$

$$\text{Into conventional } CV: \begin{bmatrix} \hat{r}^{(CA)} \\ \hat{e}^{(CV)} \\ \hat{a}^{(CP)} \end{bmatrix} \equiv \begin{bmatrix} \hat{r} \\ \hat{\dot{r}} \\ \hat{\ddot{r}} \\ \hline \hat{e} \\ \hat{\dot{e}} \\ \hline \hat{a} \end{bmatrix} \Rightarrow \begin{bmatrix} \hat{r} \\ \hat{\dot{r}} \\ \hat{e} \\ \hat{\dot{e}} \\ \hat{a} \\ 0 \end{bmatrix} \quad \text{Equation 24}$$

$$\text{Into conventional } CA: \begin{bmatrix} \hat{r}^{(CA)} \\ \hat{e}^{(CV)} \\ \hat{a}^{(CP)} \end{bmatrix} \equiv \begin{bmatrix} \hat{r} \\ \hat{\dot{r}} \\ \hat{\ddot{r}} \\ \hline \hat{e} \\ \hat{\dot{e}} \\ \hline \hat{a} \end{bmatrix} \Rightarrow \begin{bmatrix} \hat{r} \\ \hat{\dot{r}} \\ \hat{\ddot{r}} \\ \hat{e} \\ \hat{\dot{e}} \\ 0 \\ \hat{a} \\ 0 \\ 0 \end{bmatrix} \quad \text{Equation 25}$$

likelihood of detecting the target again and collecting accurate data the next time it is detected.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A method for initiating a target track utilizing a rotating radar antenna having an electronic scanning antenna comprising the steps of:
   rotating the radar antenna and electronically scanning in azimuth and elevation; and
   for a given scan,
   acquiring range (r), elevation (e), and azimuth (a) component measurement data corresponding to multiple detections of a target;
   generating individual independent component state vectors for each of said r, e, and a measurement components according to one of an at least a CP model, a CV model, and a CA model, selection of said model dependent upon comparison of parameter values of the corresponding component measurement data with a corresponding threshold;
   composing an initial state vector for an initial target track according to said individual independent component state vectors of said r, e, and a, and their associated covariance component vectors; and
   applying data corresponding to said initial state vector to a tracking program to allow tracking of said detected target.

2. The method of claim 1, wherein the initial state vector has predictive validity for the true measurement errors and target motion.

3. The method of claim 1, further including the step of calculating and composing one or more corresponding covariance matrices associated with each of said r, e and a individual independent component state vectors.

4. The method of claim 1, wherein selection of said models further includes a CJ model.

5. The method of claim 1, wherein the dimension of a space of all possible state vectors is determined by the number of degrees of freedom in the acquired data.

6. The method of claim 1, wherein the points in a space of all possible state vectors correspond to the possible combinations of kinematical orders using said target detections.

7. The method of claim 1, further including the step of scheduling verification beams.

8. The method of claim 1, further including the step of determining if the target is sufficiently close to resolve into components of motion.

9. The method of claim 1, further including the step of reporting a new target.

10. The method of claim 1, wherein the step of applying data corresponding to said initial state vector to a tracking program to allow tracking of said detected target further includes step of transforming the state vector into Cartesian coordinates.

11. A system for initiating a target track utilizing a rotating radar antenna having an electronic scanning radar antenna comprising:
   means for acquiring range (r), elevation (e) and azimuth (a) component measurement data of multiple detections of a target;
   means for forming multiple models for each degree of freedom of target motion;
   means for forming individual independent component state vectors for each of said r, e, and a measurement components according to one of said models and forming corresponding covariance matrices associated with said r, e, and a components; and
   means for composing an initial state vector having predictive validity of true measurement errors and target motion, using said individual components state vectors and said corresponding covariance matrices.

12. A method for initiating a target track utilizing a rotating radar antenna having incorporated an electronic scanning antenna for detecting radar targets comprising the steps of searching for targets; detecting two or more targets; calculating if the targets are within a pre defined spatial relationship and if so,
   determining if a spatial relationship of the range components of the target detections exceeds a predetermined threshold, then selecting a CV model and otherwise selecting a CP model, and applying said selected model to determine independent component state vectors for said range components;
   determining if a spatial relationship of the azimuth components of the target detections exceeds a predetermined threshold, then selecting a CV model and otherwise selecting a CP model, and applying said selected model to determine independent component state vectors for said azimuth components.

13. The method of claim 12, including the step of searching for targets if detecting one or more targets is not verified.

14. The method of claim 12, further including the step of if a CP model for said range component is chosen then estimating the range using a weighted average and if a CV model is chosen then estimating the range using a method of least squares.

15. The method of claim 12, wherein each detection provides independent component measurements for range, elevation and azimuth.

16. The method of claim 12, wherein each detection provides the respective measurement times of the detections.

17. The method of claim 12, wherein each detection has an associated confidence interval defined by the measurement component and respective variances.

18. The method of claim 1, wherein the step of generating said individual independent component state vectors for each of said r, e, and a measurement components according to one of an at least a CP model, a CV model, and a CA model, further includes selecting said CV model when the azimuth component spatial relationship between said target detections is determined as:

$$\frac{(A_1 - A_2)^2}{\sigma_A^2(1) + \sigma_A^2(2)} > \delta^2$$

wherein $A_1$ represents the azimuthal measurement component for the first detection, $A_2$ represents the azimuthal measurement component for the second detection, $\sigma_A^2(1)$ and $\sigma_A^2(2)$ represent the respective variances of the azimuthal component detections, and $\delta^2$ represents a selected threshold value.

* * * * *